UNITED STATES PATENT OFFICE.

FREDERICK W. A. FRERICHS, OF ST. LOUIS, MISSOURI.

PROCESS OF MAKING BROMIDES OF THE ALKALIES.

SPECIFICATION forming part of Letters Patent No. 414,835, dated November 12, 1889.

Application filed May 9, 1889. Serial No. 310,148. (No specimens.)

*To all whom it may concern:*

Be it known that I, FREDERICK W. A. FRERICHS, a citizen of the United States, residing at St. Louis, in the State of Missouri, have invented certain new and useful Improvements in the Manufacture of Bromide of Potassium, Bromide of Sodium, and Bromide of Ammonium, of which the following is such a full, clear, and exact description as will enable any one skilled in the art to which it appertains to make and use the same.

Up to the present time the manufacture of bromide of potassium and bromide of sodium is generally carried out by a succession of four different processes, in the following order:

First. Carbonate of potassium and carbonate of sodium are made from sulphate of potassium and sulphate of sodium, respectively, according to the so-called "Leblanc process."

Second. Hydroxide of potassium and hydroxide of sodium are made from the carbonate of potassium and the carbonate of sodium, respectively, by boiling the latter with lime-water, by which the following reaction is caused:

For hydroxide of potassium—
$$K_2CO_3 + Ca(OH)_2 = 2KOH + CaCO_3.$$
For hydroxide of sodium—
$$Na_2CO_3 + Ca(OH)_2 = 2NaOH + CaCO_3.$$

Third. A mixture of bromide and bromate of potassium and of bromide and bromate of sodium results by the reaction of hydroxide of potassium and hydroxide of sodium upon bromine, according to the following formula:

For bromide of potassium—
$$6KOH + 6Br = 5KBr + KBrO_3 + 3H_2O.$$
For bromide of Sodium—
$$6NaOH + 6Br = 5NaBr + NaBrO_3 + 3H_2O.$$

Fourth. Bromide of potassium and bromide of sodium are made from the mixture of bromide and bromate of potassium and bromide and bromate of sodium by smelting them with powdered charcoal. The reaction takes place according to the following formula:

For bromide of potassium—
$$5KBr + KBrO_3 + 3C = 6KBr + 3CO.$$
For bromide of sodium—
$$5NaBr + NaBrO_3 + 3C = 6NaBr + 3CO.$$

Every one of these four processes is carried out by separate sets of plant or machinery, and particularly the articles produced by the first and second process form the object of manufacture of distinct branches of the chemical industry on account of the large amount of machinery required for them.

The quantities of caustic potash (KOH) or caustic soda (NaOH) used in the manufacture of bromides and other fine chemicals requiring the employment of very pure raw materials are very small compared to what is consumed by soap-manufacturers and others who use the great bulk of caustic soda and caustic potash, and do not require anything better than what is produced in their works. For this reason the manufacturers especially of caustic potash find it unprofitable to put a pure quality of caustic potash on the market, and thus compel manufacturers of bromide of potassium and bromide of sodium to use an impure raw material.

The manufacture of bromide of ammonium is generally carried out by a succession of the following two processes: First, ammonia-gas is made from sulphate of ammonium and lime-water according to the following formula:

$$(NH_4)_2SO_4 + Ca(OH)_2 = CaSO_4 + 2H_2O + 2NH_3,$$

and the gas is absorbed by water; second, water of ammonia is decomposed by bromine according to the following formula:

$$4NH_4OH + 3Br = 3NH_4Br + N + 4H_2O,$$

thus forming bromide of ammonium and losing twenty-five per cent. of the ammonia-gas, as (four) $4NH_4OH$ is put in reaction and only (three) $3NH_4$ is combined with bromine and obtained as a useful product, the rest being wasted in the form of nitrogen and water.

My process enables me to manufacture bromide of potassium, bromide of sodium, and bromide of ammonium directly from sulphate of potassium, sulphate of sodium, and sulphate of ammonium and bromine in one single operation. The cost price is thereby reduced to a considerable extent. In the manufacture of bromide of ammonium according to my process no ammonia is lost. Caustic potash or caustic soda which were hitherto employed in the manufacture of bromides generally contain from five to ten per cent. impurities, part of which cannot be eliminated from the product. Sulphate of potassium, sulphate of sodium, and sulphate of ammonium, which are exclusively used in my process, can easily be obtained in a chemically-pure quality. Therefore no impurities can possibly be found in bromides manufactured by my process. My process enables me, therefore, to produce a superior article at less cost. It is carried out in the following way: A mixture of water, slaked lime, sulphite of lime, or bisulphite of lime and sulphate of potassium, sulphate of sodium or sulphate of ammonium, respectively, are contained in a suitable vessel, to which bromine is added. The following two reactions take place in the same solution:

For bromide of potassium—
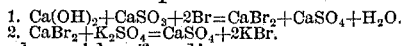

For bromide of sodium—
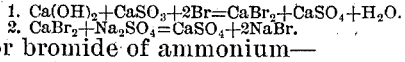

For bromide of ammonium—

After thoroughly mixing, the solution is filtered off from the precipitated sulphate of calcium, and it then contains all the bromide of potassium, sodium, or ammonium, as the case may be. By evaporating and crystallizing this solution the pure bromides are obtained.

Instead of calcium hydroxide, in my process I may use calcium carbonate, barium hydroxide, and barium carbonate.

Having thus described my invention, what I claim as new, and desire to secure by Letters Patent of the United States, is—

1. The improvement in the process of manufacturing bromides, which consists in treating sulphurous acid and sulphurous-acid compounds with bromine in the presence of calcium or barium hydroxides or carbonates, and in combination with sulphates of alkalies, substantially as specified.

2. The process of manufacturing bromides by reaction of sulphates of the desired base, bromine and calcium hydroxide, in combination with sulphurous acid or sulphurous-acid compounds.

3. The process of manufacturing bromide of potassium, bromide of sodium, and bromide of ammonium from sulphate of potassium, sulphate of sodium, and sulphate of ammonium, respectively, by mixing sulphate of potassium, sulphate of sodium, and sulphate of ammonium with calcium hydroxide, calcium sulphite, or calcium bisulphite, water, and bromine, substantially as described.

In testimony whereof I have hereunto set my hand and affixed my seal, this 7th day of May, 1889, in the presence of two subscribing witnesses.

FREDERICK W. A. FRERICHS. [L. S.]

Witnesses:
A. C. FOWLER,
M. S. REEDER.